May 13, 1969  S. E. HARRIS ET AL  3,444,479
METHOD AND APPARATUS FOR PRODUCING A FREQUENCY
MODULATED LASER BEAM
Filed Feb. 2, 1965

INVENTORS,
STEPHEN E. HARRIS,
RUSSELL TARG
BY *Harry E. Aine*
ATTORNEY

United States Patent Office 3,444,479
METHOD AND APPARATUS FOR PRODUCING A FREQUENCY MODULATED LASER BEAM
Stephen E. Harris and Russell Targ, Palo Alto, Calif.; said Targ assignor to Sylvania Electric Products Inc., a corporation of Delaware
Filed Feb. 2, 1965, Ser. No. 429,831
Int. Cl. H01s 3/05, 3/10, 3/22
U.S. Cl. 331—94.5         6 Claims This invention relates to optical masers or lasers, and more particularly to a method of and apparatus for producing a frequency modulated laser beam.

A gas laser, such as a helium-neon (He-Ne) laser, continuously emits a beam comprised of several frequencies or modes, each having a high degree of spectral purity. The individual modes have known and approximately equal frequency spacing and oscillate simultaneously but with random phases over the width of the amplifying atomic transition. Multimode laser operation detracts from the coherence of the laser output and inability to control or relate the phases of these modes to each other has limited the utility of the laser for communications and other applications.

An object of this invention is the provision of apparatus for producing a laser beam comprising modes oscillating with frequency modulation (FM) phases and with approximately Bessel function amplitudes.

Another object is the provision of a method of controlling a multimode laser beam so that all of the laser modes oscillate as the sidebands of a frequency modulated signal.

A further object is the provision of a technique of sweeping a laser oscillation frequency over the entire Doppler linewidth at a predetermined sweep frequency which is approximately that of the axial mode spacing.

In accordance with the invention, an optical phase modulator is disposed in the cavity of a gas laser and is driven at a frequency which is close to but different than the frequency spacing of the laser modes. The modulation frequency, then, may be approximately but not exactly equal to the axial mode spacing. All of the modes in the modulated laser output oscillate with the phase relationship that characterizes the sidebands of a frequency modulated signal and additionally have relative amplitudes which closely approximate those of FM signal sidebands. Thus the resulting laser oscillation frequency in effect sweeps across the band with a sweep frequency equal to the modulating frequency.

Figure 1:
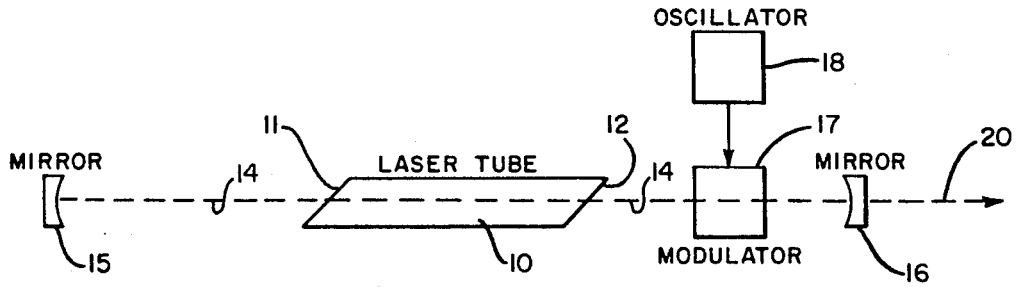
Figure 4:
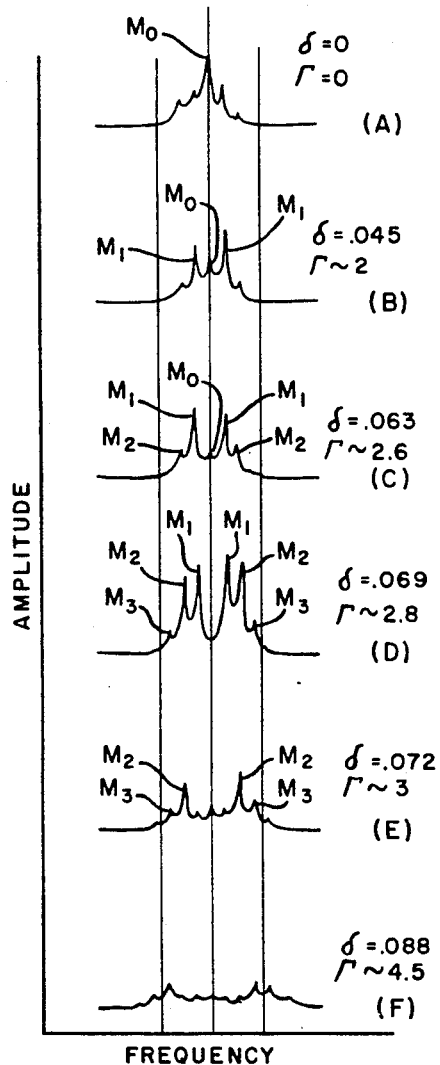
Figure 2:
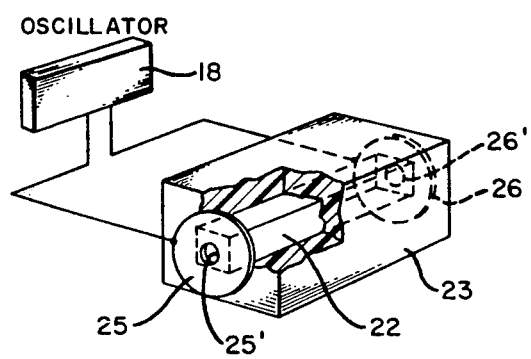
Figure 3:
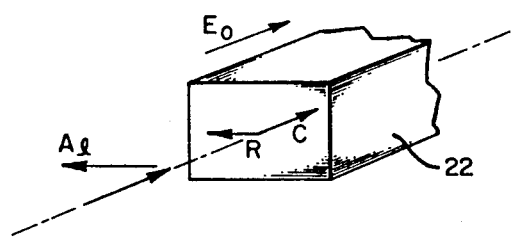

These and other objects of the invention will become apparent from the following description of a preferred embodiment thereof reference being had to the accompanying drawings in which:

FIGURE 1 is a schematic representation of laser apparatus embodying the invention;
FIGURE 2 is an isometric drawing of a modulator forming part of the apparatus of FIGURE 1;
FIGURE 3 is an enlarged view of the electro-optic crystal of the modulator showing the directions of the electric field, the crystal axes and laser beam polarization relative to the direction of propagation; and
FIGURE 4 is a series of oscillograms showing laser modes of unmodulated and modulated laser outputs.

Referring now to the drawings, a continuous laser oscillator 10, such as He-Ne gas laser, has Brewster angle windows 11 and 12 and is operated to produce an output beam 14 which is redirected through the oscillator and along its axis by fully reflecting mirror 15 and partially reflecting mirror 16 spaced from the respective windows.

An electro-optical modulator 17 is disposed in the laser cavity between mirror 16 and the end of the laser 10 aligned with the axis of the latter so that the output 14 of the laser passes through the modulator. A radio frequency oscillator 18 drives modulator 17 at a predetermined frequency $\omega_0$ described below and converts the beam of the free-running laser from a characteristic multimode pattern with the phases and amplitudes of the modes randomly related to a pattern in which all of the modes oscillate with frequency modulation phases and with nearly Bessel function amplitudes. This FM laser beam 20 appears as the output from mirror 16.

The axial mode spacing $\omega_m$ of free-running laser oscillations is equal to $\pi c/L$, where $c$ is the velocity of light and $L$ is the optical path length between mirrors defining the laser cavity. In one embodiment of the invention, a He-Ne laser operating at a wavelength of 6328 Angstroms had a mirror spacing which provided an axial mode spacing $\omega_m$ of 100.5 mc. We discovered that tuning oscillator 18 to a frequency $\omega_0$ that is slightly offset from the axial mode spacing, i.e., 100 mc, for the laser described above, the laser modes oscillated with FM phases and with approximately Bessel function amplitudes. The laser modes thus locked essentially comprise the sidebands of an FM signal and the laser oscillation frequency is, in effect, swept over the entire Doppler linewidth at a sweep frequency $\omega_0$ equal to that of oscillator 18.

Modulator 17 introduces a phase perturbation into the laser cavity at the frequency of the driving oscillator 18 and may, by way of example, be a crystal of potassium dihydrogen phosphate ($KH_2PO_4$), known as KDP. In one form of the invention, a KDP crystal in the shape of an elongated square block 22, see FIGURES 2 and 3, is supported in a dielectric holder 23 with longitudinal or C axis of the crystal aligned with output beam 14 of laser 10. Washer-like terminals 25 and 26 made of an electrical conductor and having central openings 25' and 26', respectively, are mounted on the ends of holder 23 in electrical contact with the ends of the crystal. The output of oscillator 18 is connected to terminals 25 and 26 so that the electric field $E_0$ developed by the oscillator in the crystal is parallel to the optic or C axis and the electrically induced axis R in the crystal is parallel to the direction of laser polarization indicated by the vector $A_1$. When crystal 22 is oriented in this manner, a substantially pure phase perturbation is introduced into the laser cavity with minimum time varying losses. As the field $E_0$ varies, the refractive index of the crystal for the laser beam polarized along axis R also varies at the oscillator frequency, thus effectively changing the optical path length through the crystal and producing phase modulation of the laser beam.

Apparatus embodying this invention was constructed and successfully operated to produce an FM laser beam. The characteristics and performance of such apparatus were as follows:

Laser oscillator 10—He-Ne laser (Spectra-Physics Model 116):
   Operating wavelength _____ A__  6328
Optical path length between mirrors 15 and
   16 _____ cm__  ~150
Axis mode interval $c/2L$ _____ mc__  100.5
Oscillator 18:
   Output (modulation) frequency _mc__  100
   Power _____ watts__  4
Crystal 22:
   Material _____  $KH_2PO_4$
   Length _____ cm__  1
   Orientation—C axis parallel to laser beam; C axis parallel to modulation field $E_0$.
   Depth ($\delta$) of single pass modulation _____ radians__  0.045–0.088
   Depth ($\Gamma$) of frequency modulation on beam 20 _____  2.0–4.5

FIGURE 4 illustrates actual traces of an oscilloscope connected to the output of a scanning interferometer into which the output beam from the apparatus shown in FIGURE 1 and described above is directed. FIGURE 4(a) shows the unmodulated laser modes which result when oscillator 18 is de-energized, the central mode $M_0$ being the dominant frequency of the laser. When oscillator 18 is energized and the frequency deviation or single-pass phase retardation $\delta$ is adjusted to 0.045 at the optical frequency, the laser modes appear as shown in FIGURE 4(b). It will be noted that the central mode $M_0$ has begun to fall and the first pair of sidebands $M_1$ begin to rise. As the magnitude of $\delta$ is increased, second and third pairs $M_2$ and $M_3$, respectively, of sidebands grow significantly and there is a diffusion of power toward the wings of the Doppler line. The measured heights of these sideband modes were approximately Bessel function amplitudes. The ratio $\Gamma/\delta$ which is the ratio by which the modulation process is enhanced by the presence of the cavity and active media is approximately 40. The highest measured value of $\Gamma$ was approximately 6 which at a modulation frequency of 100 mc. corresponds to a peak-to-peak frequency swing of 1200 mc.

What is claimed is:

1. Apparatus for producing a laser beam with frequency modulation sidebands comprising:
    a laser oscillator having an optical cavity of predetermined optical length L and characterized by being capable of oscillating in a plurality of independent cavity modes
    said cavity modes having an average frequency spacing $\omega_m$ equal to $$\frac{\pi c}{L}$$

where $c$ is the velocity of light,
    means for modulating the optical length L of said optical cavity, and
    means forming a signal generator for generating a radio frequency oscillator signal having a frequency $\omega_0$, means for electrically coupling said signal generator means to said modulator means to produce phase modulation of said laser oscillator output at the radio frequency $\omega_0$,
    the frequency $\omega_0$ of the radio frequency oscillator signal being approximately but not exactly equal to said cavity mode spacing $\omega_m$, whereby said laser is caused to oscillate with frequency modulation sidebands having nearly Bessel function amplitudes.

2. Apparatus according to claim 1 in which said phase modulator is an optical phase modulator physically located within said laser cavity.

3. Apparatus for producing a laser beam with frequency modulated oscillations, comprising
    a laser oscillator having an output with a plurality of axial laser cavity modes oscillating at different frequencies,
    an optical phase modulator disposed to receive said output of the laser oscillator, and
    a radio frequency oscillator electrically connected to said modulator and said oscillator being tuned to and having an output frequency approximately equal to the differences between frequencies of adjacent modes of the laser oscillator output.

4. Apparatus according to claim 3 in which said modulator comprises a crystal of potassium dihydrogen phosphate.

5. The method of producing a frequency modulated laser beam consisting of the steps of
    generating a laser beam characterized by a plurality of oscillating modes at different frequencies, and
    phase modulating said laser beam substantially at the frequency difference of the mode oscillations.

6. The method of producing a frequency modulated laser beam consisting of the steps of
    energizing a laser oscillator and producing within the laser cavity a beam having a plurality of oscillating modes at different frequencies,
    directing said laser beam through an electro-optic modulator in the laser cavity, and
    driving said modulator at a frequency approximately but not exactly equal to $$\frac{\pi c}{L}$$

where $c$ is the velocity of light and L is the optical path length of said laser cavity.

No references cited.

RONALD L. WIBERT, *Primary Examiner.*

W. L. SIKES, *Assistant Examiner.*